United States Patent [19]

Upson et al.

[11] Patent Number: 4,497,917
[45] Date of Patent: Feb. 5, 1985

[54] LATEX COMPOSITION COMPRISING CORE-SHELL POLYMER PARTICLES

[75] Inventors: Donald A. Upson, Webster; Diane E. Kestner, Hilton, both of N.Y.

[73] Assignee: Eastman Kodak Company, Rochester, N.Y.

[21] Appl. No.: 427,066

[22] Filed: Sep. 29, 1982

[51] Int. Cl.³ .................... C08L 23/00; C08L 31/02; C08F 10/00
[52] U.S. Cl. .................... 523/201; 524/458; 524/515; 428/290
[58] Field of Search .............. 523/201; 524/458, 515; 428/290

[56] References Cited

U.S. PATENT DOCUMENTS

| | | | |
|---|---|---|---|
| 3,232,903 | 2/1966 | Schmidle et al. | 524/515 |
| 3,668,127 | 6/1972 | Machida et al. | 523/201 |
| 3,745,136 | 7/1973 | Huhn et al. | 523/201 |
| 3,985,703 | 10/1976 | Ferry et al. | 523/201 |
| 4,199,486 | 4/1980 | Boessler et al. | 523/201 |

OTHER PUBLICATIONS

Polymer Handbook, Ed. Brandrup et al., pp. III-62-III--72.
Product Licensing Index, "Research Disclosures", Dec. 1971.

Primary Examiner—Lorenzo B. Hayes
Assistant Examiner—Amelia B. Yarbrough
Attorney, Agent, or Firm—John R. Everett

[57] ABSTRACT

Latex compositions comprising core-shell polymer particles are disclosed. The core has a glass transition temperature greater than 70° C. The shell has a glass transition temperature of from about 25° to 60° C. The compositions form coalesced coatings that are resistant to ferrotyping.

10 Claims, No Drawings

LATEX COMPOSITION COMPRISING CORE-SHELL POLYMER PARTICLES

FIELD OF THE INVENTION

Novel latex compositions comprising core-shell polymer particles, methods of making such compositions and use of such compositions as coalesced ferrotyping resistant layers in photographic elements are disclosed.

BACKGROUND OF THE INVENTION

Hydrophobic polymers are often used in photographic elements as overcoats or binders. Such polymers are water resistant and have a reduced tendency to stick to hydrophilic surfaces such as photographic emulsion, under conditions of high temperature and relative humidity. The latter phenomenon is referred to as ferrotyping in the photographic arts. Hydrophobic polymers having a glass transition temperature (Tg) above about 70° C. are resistant to ferrotyping. Such polymers are often coated from organic solvent-based solutions. Continuous films are formed simply by evaporation of the solvent.

Polymer particles of aqueous latex compositions used for making coatings on photographic film generally have a Tg less than about 70° C. in order to achieve coalescence of the polymer particles to a continuous film. Under temperature and residence time conditions generally used in making coatings on photographic film bases and layers, it is normally not possible to fully coalesce a water-borne latex polymer to a continuous film if the Tg exceeds about 70° C., unless volatile organic coalescing aids are utilized. This represents a severe limitation since such materials must be removed from the final film.

However, because of economic and environmental considerations, there is a need to replace organic solvent-based coating systems with water-based coating systems. In order to fill this need, it is necessary to form continuous films from latex polymers which are resistant to ferrotyping.

Core-shell latex polymer particles are disclosed in Kobunshi Ronbunshu, Eng. Ed., Vol. 5, No. 11, 1976, page 894. However, these polymers do not form coalesced continuous layers.

SUMMARY OF THE INVENTION

The present invention provides a latex composition comprising a continuous aqueous phase having dispersed therein core-shell polymer particles wherein the core has a glass transition temperature (Tg) greater than 70° C. and the shell has a glass transition temperature (Tg) from about 25° C. to 60° C. Because of the relatively low Tg shell, the core-shell polymer particles can be coated to form layers which coalesce sufficiently to form continuous layers under the temperature and residence time conditions under which coatings are made on photographic film bases and layers. The continuous layers are also resistant to ferrotyping.

The present invention also provides an element, including a photographic element, comprising a support and layer containing the core-shell polymers of the invention.

Preferred latex compositions comprise core-shell polymer particles in which the core polymer comprises recurring units having the structure:

$$-A)_x$$

and the shell polymer comprises recurring units having the structure:

$$-B)_y$$

wherein:

A represents one ore more polymerized $\alpha,\beta$-ethylenically unsaturated monomer and has a glass transition temperature (Tg) greater than 70° C.;

B represents one or more polymerized $\alpha,\beta$-ethylenically unsaturated monomer and has a glass transition temperature (Tg) from about 25° C. to 60° C.;

x represents 80 to 95 weight percent of the entire particle; and y represents from 5 to 20 weight percent of the entire particle.

DETAILED DESCRIPTION OF THE INVENTION

The polymers of the invention are conveniently prepared as a latex in two stages by known emulsion polmerization techniques. Descriptions of such techniques are disclosed in W. P. Sorenson and T. W. Campbell "Preparative Methods of Polymer Chemistry", 2nd Edition, N.Y., N.Y., Wiley (1968) and M. P. Stevens "Polymer Chemistry—an Introduction", Addison-Wesley Publishing Co., Reading, Mass. (1975).

Generally, the polymers are prepared by dissolving a polymerization catalyst and an emulsifying agent in nitrogen sparged water. The monomers referred to in the above formula as A are selected and mixed in approximately the weight ratio desired in the final polymer. The mixture of monomers is neutralized if necessary. The mixture is added slowly to the solution of the polymerization catalyst and emulsifying agent at a temperature above about 80° C. The reaction is allowed to procede until the reaction is completed thus forming a latex containing particles of the core polymer. Then a mixture of the monomers referred to as B are added to the latex. The reaction is carried out as above to form a latex comprising the core-shell polymer particles of the invention. The resulting latex compositions contain from 1 to 50 weight percent core-shell polymer particles, preferably from 15 to 25 weight percent core-shell polymer particles.

The relative amounts of the monomers selected to form A or B are determined by the desired Tg of the core or the shell respectively. The Tgs of many homopolymers of $\alpha,\beta$-ethylenically unsaturated monomers useful in the present invention are disclosed in "Polymer Handbook" by Brandrup et al, pages III-61 to III-71, Interscience Publishers, Wiley & Son, New York, 1966. The Tg of a copolymer can be predicted from a knowledge of the weight fraction (W) of each monomer in the copolymer and the Tg of the corresponding homopolymers according to the formula:

$$Tg(copolymer) = W_1(Tg_1) + W_2(Tg_2) + \ldots + W_n(Tg_n)$$

Using this relationship core-shell polymer particles having the desired core-shell Tg relationship using several different monomeric components are prepared. Calculated Tgs, according to the above formula are generally accurate to ±5° C.

α,β-Ethylenically unsaturated monomers from which the core-shell polymer particles are formed include acrylic acids including acrylates, methacrylic acids including methacrylates, styrene including substituted styrenes, acrylonitrile and methacrylonitrile, esters of vinyl alcohol, dienes, vinyl and vinylidene halides, vinyl ethers and olefins.

Useful acrylates include methyl acrylate, ethyl, acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, tetrahydrofurfuryl acrylate, phenyl acrylate, and the like.

Useful methacrylates include methyl methacrylate, ethyl methacrylate, propyl methacrylate, isopropyl methacrylatee, butyl methacrylate, amyl methacrylate, hexyl methacrylate, cyclohexyl methacrylate, benzyl methacrylate, chlorobenzyl methacrylate, octyl methacrylate, N-ethyl-N-phenylaminoethyl methacrylate, 2-methoxyethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, and the like.

Additional useful monomers are disclosed in "Polymer Handbook" by Brandrup et al, pages VIII-1 et sequel, Interscience Publishers, Wiley & Son, New York, 1966.

The following preparations illustrate a typical two-stage emulsion polymerization method of making the core-shell polymer of the invention. The numbers in the parenthesis following the polymer names are the weight percents of each monomer in the total polymer particle.

EXAMPLE 1

Preparation of a latex composition comprising a polymer particle (I) having a core of poly(n-butyl methacrylate-co-styrene) (weight ratio 30:60) and a shell of poly(n-butyl methacrylate), the shell polymer comprising 10 percent by weight of the latex polymer particle.

Stage 1—A pre-emulsified mixture of 300 g of n-butyl methacrylate; 600 g of styrene; 14 g of 50% Surfactant 10G, a surface-active agent sold by Olin Chemical Company; 3.5 g of hexadecyltrimethylammonium bromide (CTAB); 5.0 g of 2,2′-azobis(2-amidinopropane) . 2HCl; and 900 g of water which had been sparged with nitrogen was added over about a two-hour period to a stirred mixture maintained at 80° C. of 4 g of 50% Surfactant 10G; 1.0 g of CTAB; 0.85 g of 2,2′-azobis(2-amidinopropane) . 2HCl; and 900 g of water which had been sparged with nitrogen; and the mixture was stirred two and one-half to three hours after the pre-emulsified monomer addition was complete, thus forming a latex containing particles of the core polymer.

Stage 2—A mixture of 100 g of n-butyl methacrylate; 1 g of 2,2′-azobis(2-amidinopropane) . 2HCl; and 30 g of nitrogen-sparged water was added to the latex of Stage 1 at 80° C. and polymerization continued another one and one-half hours. The latex containing particles of the total core-shell polymer was allowed to cool and evaluated for use in photographic coatings.

The Tg of the core and shell of the core-shell polymer particles I was determined according to the previously described formula:

$$Tg(\text{copolymer}) = W_1(Tg_1) + W_2(Tg_2) + \ldots + W_n(Tg_n)$$

The Tg of the relevant homopolymers are as follows:
a. poly(styrene): 373° K. (100° C.)
b. poly(methyl methacrylate): 378° K. (105° C.)
c. poly(n-butyl methacrylate): 306° K. (33° C.)

The weight fraction of N-butyl methacrylate in the polymer core is 300 g/300 g + 600 g or 0.33. Similarly, the weight fraction of styrene in the polymer core is 0.67.

Hence, $$Tg(\text{copolymer}) \text{ core} = .33 (306° K.) + .67 (373° K.)$$
$$= 351° K. = 78° C.$$

The shell is homopolymer c) and thus has a Tg of 33° C.

The above Tg values were confirmed by comparing the calculated Tg value for the entire core-shell polymer particle with the measured Tg value of the same particle.

$$Tg(\text{core-shell polymer particle}) = 0.9 \times 351° K. + 0.1 \times 306° K. = 73.5° C.$$

The Tg was measured by differential scanning calorimetry. The measured value was 74° C.

EXAMPLE 2

Preparation of a latex composition comprising polymer particles (II) having a core of poly(n-butyl methacrylate-co-methyl methacrylate) (weight ratio 35:55) and a shell of poly(n-butyl methacrylate), the shell polymer being 10 weight percent of the total latex polymer particle.

This polymer was prepared by the two-stage procedure of Preparation 1 except that methyl methacrylate was used in place of styrene, and the monomer weight ratios employed were as indicated in the title. Calculated core and shell Tgs are 77° C. and 33° C. respectfully.

EXAMPLE 3

Preparation of a latex composition comprising polymer particles (III) having a core of poly(n-butyl methacrylate-co-styrene) (weight ratio 32:58) and a shell of poly(n-butyl methacrylate-co-styrene) (weight ratio 80:20), the shell polymer being 10 weight percent of the polymer particle.

This core-shell polymer latex was prepared by the two-stage procedure of Preparation 1 except that styrene was also added in Stage 2 at a monomer ratio of n-butyl methacrylate-co-styrene of 80:20; such that the weight percent of shell polymer was still 10% of the total latex polymer. The calculated Tg of the core and shell are 76° C. and 56.4° C.

The latex compositions of the invention are coated as binders or overcoats onto a useful substrate, such as a conventional photographic support or silver halide emulsions, using conventional techniques. It is specifically contemplated to coat the latex compositions of the invention using coating hoppers and other apparatus conventionally employed in the photographic arts for forming single or multiple coatings on photographic supports. Useful coating techniques and supports are described in the *Product Licensing Index*, vol. 92, pages 107–110, December, 1971, and the publications referred to therein.

Although the preferred embodiments are useful in photographic elements, the present invention is not limited to photographic materials and processes, but is useful wherever it is deemed desirable to use continuous layers of a polymeric material.

The following examples are presented to illustrate the ferrotype-resistant film backing layers which are formed from the latex compositions of the invention.

EXAMPLE 4

Three different antistatic compositions containing an antistatic polymer microgel and a latex binder were prepared in a ratio of one part latex to one part antistatic polymer with a total solids content ranging from 1 to 1.4% solids. In some cases, a nonionic surfactant, not exceeding 1% of the total solids weight was added to improve coatability. These mixtures were coated on biaxially oriented poly(ethylene terephthalate) film support which had previously been coated with a vinylidene chloride copolymer. The coating compositions of the three antistatic layers were:

1. 0.6 weight percent poly(n-butyl methacrylate-co-styrene) (weight ratio 40:60) and 0.6 weight percent antistatic poly(vinylbenzyltrimethylammonium chloride-co-ethylene glycol dimethacrylate) (mole ratio 93:7) in water containing 0.5 weight percent of the total solids weight of a nonionic surfactant.
2. 0.6 weight percent poly(n-butyl methacrylate-co-styrene) (weight ratio 50:50) and 0.6 weight percent of the same antistatic polymer used above in water containing 0.5 weight percent of the total solids weight of a nonionic surfactant.
3. 0.6 weight percent core-shell polymer (I) and 0.6 weight percent the same antistatic polymer used above in water containing 0.5 weight percent of the total solids weight of a nonionic surfactant.

The antistatic layer was then directly overcoated with the following coating compositions to form film backings 1-A, 2-A and 3-A. The latex compositions used in forming 1-A and 2-A have Tgs outside the scope of the present invention.

1-A 4 weight percent poly(n-butyl methacrylate-co-styrene) (weight ratio 40:60), 1 weight percent of the total binder weight of a poly(methyl methacrylate) matte and 3 weight percent of the total binder weight of a nonionic surfactant in water.

2-A 4 weight percent poly(n-butyl methacrylate-co-styrene) (weight ratio 50:50), 1 weight percent of the total binder weight of a poly(methyl methacrylate) matte and 3 weight percent of the total binder weight of a nonionic surfactant in water.

3-A 4 weight percent of core-shell polymer I, 1 weight percent of the total binder weight of a poly(methyl methacrylate) matte, and 3 weight percent of the total binder weight of a nonionic surfactant in water.

The above examples of film backings were evaluated for ferrotyping before and after development against the same silver halide photographic emulsion.

The ferrotyping evaluation was carried out by means of an insert ferrotyping test. The purpose of the test is to determine the effect on an emulsion of winding the emulsion under tension in contact with a film backing. The test is carried out according to the following procedure.

Four strips of the emulsion are kept at 70° F. and 50% relative humidity (RH) to be used as undeveloped and developed controls for comparison purposes. These control strips are not subjected to the insert ferrotyping test. In photographic darkness, two holes are punched in the center of each film backing strip. The holes are ¼ inch in diameter and spaced approximately 3 inches apart. These holes provide areas on the corresponding emulsion test strip which do not contact the backing. Such areas serve as check areas for evaluation of the degree of ferrotyping.

Each film backing and the selected emulsion are conditioned as follows. Eight strips representing the emulsion and eight strips representing the film backing are conditioned overnight (16 hours) on pin racks at 70° F. and 60% (RH) in photographic darkness. Two 300-foot rolls of clear film leader are conditioned to 60% RH and two to 70% RH.

After conditioning, approximately 50 feet of leader are wound into a roll on a 35 mm core at 24-ounce tension. One strip representing emulsion and one representing the film backing are placed in emulsion-to-backing contact and wound into the roll. This is repeated three times in each roll for each film backing and emulsion combination. The paired emulsion strips are spaced about 2 feet apart. About 10 feet is maintained between each group of four pairs. At least 50 feet of leader are reserved for winding after the last emulsion film backing pair is inserted. Each roll is placed in a conditioned plastic bag and sealed in a can with two laps of tape. One can each from the 60% RH group and the 70% RH group is kept for 3 days at 120° F. One can each from the 60% RH group and the 70% RH group is kept for 7 days at 100° F.

After keeping, two of the control strips and two pairs of strips from each roll are developed. The strips are developed by flashing to a medium density (approximately 1.0), followed by development in a standard process.

The developed and undeveloped strip pairs are evaluated by comparison to the developed and undeveloped control strips which have not been subjected to the insert ferrotyping test. Ferrotyping is observed as glossy areas in undeveloped emulsions and as density variations in developed emulsions. Film backings were rated according to the percent the emulsion is ferrotyped while in contact with the film backing. The film backings were noted O.K. (no ferrotyping), trace (up to 5% ferrotyping), slight (5 to 20%), moderate (20–50%) and severe (over 50%).

The results are presented in Table I. The data of Table I shows that film backing layers comprising the core-shell polymer particles of this invention exhibit improved ferrotyping resistance compared to prior art film backings.

TABLE I

| Polymer Films | Undeveloped Films | | | | | | Developed Film | |
| --- | --- | --- | --- | --- | --- | --- | --- | --- |
| | 7 Days, 100° F. | | 3 Days, 120° F. | | 7 Days, 100° F. | | 3 Days, 120° F. | |
| | 60% R.H. | 70% R.H. | 60% R.H. | 70% R.H. | 60% R.H. | 70% R.H. | 60% R.H. | 70% R.H. |
| 1-A | OH | Moderate | Slight | Severe | OK | Severe | OK | Severe$^{BT}$ |
| 2-A | OK | Moderate | Moderate$^{BT}$ | Severe$^{BT}$ | OK | Moderate | OK | Severe |

TABLE I-continued

| Polymer | Undeveloped Films | | | | Developed Film | | | |
|---|---|---|---|---|---|---|---|---|
| | 7 Days, 100° F. | | 3 Days, 120° F. | | 7 Days, 100° F. | | 3 Days, 120° F. | |
| Films | 60% R.H. | 70% R.H. | 60% R.H. | 70% R.H. | 60% R.H. | 70% R.H. | 60% R.H. | 70% R.H. |
| 3-A | OK | Slight | Slight | Moderate | OK | OK | Slight | Moderate |

$BT$ refers to the transfer of the film backing to the front side of the emulsion that it was rolled against.

EXAMPLE 5

This example demonstrates the capability of the core-shell polymer particles of the invention to coalesce to form continuous layers compared to core-shell polymer particles of the prior art such as those disclosed in the previously mentioned Kobunshi Ronbunshu article.

Three different latex compositions comprising different core-shell polymers were prepared according to Preparation 1. Each composition was about 15.1% solids.

Latex A—A latex composition according to the invention containing polymer particles of core-shell polymer particle I. The core-shell Tg is 78° C. and 33° C. respectively.

Latex B—A latex composition according to the Kobunshi Ronbunshu article containing polymer particles havng a core of poly(methyl methacrylate) and a shell of poly(n-butyl methacrylate). The shell homopolymer is 40 weight percent of the total polymer composition. Core and shell Tg values are 115° C. and 39° C. respectively.

Latex C—A latex composition according to the Kobunshi Ronbunshu article containing polymer particles having a core of poly(methyl methacrylate) and a shell of poly(ethyl acrylate). The shell homopolymer is 25 weight percent of the total polymer composition. Core and shell Tg values are 122° C. and 9° C. respectively.

Each latex composition was coated over an antistatic layer coated on poly(ethylene terephthalate) film support subbed with poly(acrylonitrile-co-vinylidene chloride-co-acrylic acid) to form Elements A, B and C.

The antistatic layer was coated from the following composition.
1.2%: Latex composition (I)
0.9%: Poly(N,N,N-trimethyl-N-vinylbenzylammonium chloride-co-ethylene dimethacrylate) (mole ratio 97/3)
97.9%: Water The latex overcoats were applied as 4.0% solids dispersions with the following additives (% based on weight of solid polymer).
1.0%: Poly(methyl methacrylate) beads
3.0%: Surfactant 10G (Olin Chemical Co.)
5.0%: Carnauba wax (added as an emulsion)
The coatings were dried at 121° C.

The coalescing ability of each overcoat was tested by dippint each overcoated element into a solution of a red dye for 30 seconds. The red dye was chosen for its water solubility and its ability to be mordanted by the antistatic polymer if it penetrates the overcoat polymer and reaches the antistatic polymer. The element was removed and rinsed in 40° C. running water for 30 seconds. The coalescence was rated according to the following scale with the following results:
0 = no dye stain in the antistatic polymer
1 = very slight stain in the antistatic polymer
2 = slight stain in the antistatic polymer
3 = moderate stain in the antistatic polymer
4 = severe stain in the antistatic polymer

| Element | Appearance | Dye Stain Result |
|---|---|---|
| A | Very slight haze | 0 |
| B | Hazy | 3 |
| C | Hazy | 4 |

These results show that the dye penetrated the overcoat to stain the antistatic polymer of the prior art elements. On the other hand, the coalesced continuous overcoats of the invention prevent dye from penetrating to the antistatic layer.

The invention has been described in detail with particular reference to preferred embodiments thereof, but it will be understood that variations and modifications can be effected within the spirit and scope of the invention.

What is claimed is:

1. A latex composition comprising a continuous aqueous phase having dispersed therein core-shell polymer particles characterized in that the core polymer represents 80-95 weight percent of the entire particle and has a glass transition temperature greater than 70° C., and the shell polymer represents 5-20 weight percent of the entire particle and has a glass transition temperature from 25° C. to 60° C.

2. An element comprising a support and a coalesced continuous layer comprising from 80-95 weight percent of a first polymer having a glass transition temperature greater than 70° C. and from 5-20 weight percent of a second polymer having a glass transition temperature from about 25° C. to 60° C.

3. A photographic element comprising a support and a coalesced continuous layer comprising from 80-95 weight percent of a first polymer having a glass transition temperature greater than 70° C. and from 5-20 weight percent of a second polymer having a glass transition temperature from about 25° C. to 60° C.

4. A latex composition comprising a continuous aqueous phase having dispersed therein core-shell polymer particles in which
the core polymer comprises recurring units having the structure:

$$-A)_x$$

and
the shell polymer comprises recurring units having the structure:

$$-B)_y$$

wherein:
A represents one or more polymerized $\alpha,\beta$-ethylenically unsaturated monomer and has a glass transition temperature (Tg) greater than 70° C;
B represents one or more polymerized $\alpha,\beta$-ethylenically unsaturated monomer and has a glass transition temperature (Tg) from about 25° C. to 60° C;

x represents 80 to 95 weight percent of the entire particle; and y represents from 5 to 20 weight percent of the entire particle.

5. The composition of claim 4 wherein:

A is selected from alkyl methacrylates in which the alkyl group has 4 to 12 carbon atoms and B is selected from the group consisting of styrene and alkyl methacrylates in which the alkyl group has 1 to 4 carbon atoms.

6. The composition of claim 4 wherein the core-shell polymer particle is selected from the group consisting of a. a core of poly(n-butyl methacrylate-co-styrene(30:60)) and a shell of poly(n-butyl methacrylate);

b. a core of poly(n-butyl methacrylate-co-methyl methacrylate-(35:55)) and a shell of poly(n-butyl methacrylate); and c. a core of poly(n-butyl methacrylate-co-styrene(32:58)) and a shell of poly(n-butyl methacrylate-co-styrene (80:20)).

7. The latex compositions of claims 1, 4, 5 or 6 wherein the core polymer has a glass transition temperature in the range of 75°–80° C.

8. The latex composition of claims 1, 4, 5 or 6 wherein the core-shell polymer particles comprises from 1 to 50 weight percent of the total composition.

9. The element of claims 2 or 3 in which the first polymer has recurring units of the structure:

$$-A)_x$$

and the second polymer comprises recurring units having the structure:

$$-B)_y$$

wherein:

A represents one or more polymerized $\alpha,\beta$-ethylenically unsaturated monomer and has a glass transition temperature (Tg) greater than 70° C;

B represents one or more polymerized $\alpha,\beta$-ethylenically unsaturated monomer and has a glass transition temperature (Tg) from about 25° C. to 60° C;

x represents 80 to 95 weight percent of the first and second polymers; and y represents from 5 to 20 weight percent of the first and second polymers.

10. The element of claims 2 or 3 wherein the coalesced continuous layer is selected from the group consisting of a. a layer comprising poly(n-butyl methacrylate-co-styrene(30:60)) and poly(n-butyl methacrylate);

b. a layer comprising a core of poly(n-butyl methacrylate-co-methyl methacrylate (35:55)) and poly(n-butyl methacrylate); and c. a layer comprising poly(n-butyl methacrylate-co-styrene(32:58)) and poly(n-butyl methacrylate-co-styrene(80:20)).

* * * * *

UNITED STATES PATENT AND TRADEMARK OFFICE
CERTIFICATE OF CORRECTION

PATENT NO. : 4,497,917  Page 1 of 2
DATED : February 5, 1985
INVENTOR(S) : Donald A. Upson & Diane E. Kestner It is certified that error appears in the above-identified patent and that said Letters Patent are hereby corrected as shown below:

Col. 8, line 54, the part reading "-A)$_x$" should read -- $(\underline{A})_x$ --.

Col. 8, line 60, the part reading "-B)$_y$" should read -- $(\underline{B})_y$ --.

Col. 8, line 63, reading "A represents one or more polymerized α,62-ethyleni-" should read -- $\underline{A}$ represents one or more polymerized α,β-ethyleni- --.

Col. 8, line 66, the part reading "B represents" should read --$\underline{B}$ represents--.

Col. 9, line 6, the part reading "A is" should read --$\underline{A}$ is--.

Col. 9, line 8, the part reading "B is" should read --$\underline{B}$ is--.

Col. 9, line 28, the part reading "comprises from" should read --comprise from--.

UNITED STATES PATENT AND TRADEMARK OFFICE
CERTIFICATE OF CORRECTION

PATENT NO. : 4,497,917

DATED : February 5, 1985

INVENTOR(S) : Donald A. Upson & Diane E. Kestner

It is certified that error appears in the above-identified patent and that said Letters Patent are hereby corrected as shown below:

Col. 10, line 2, the part reading "-A)$_x$" should read -- $-(\underline{A})_x$ --.

Col. 10, line 7, the part reading "-B$_y$" should read -- $-(\underline{B})_y$ --.

Col. 10, line 10 reading "A represents one or more polymerized α,62-ethyleni-" should read --$\underline{A}$ represents one or more polymerized α,β-ethyleni- --.

Col. 10, line 13, the part reading "B represents" should read --$\underline{B}$ represents--.

Signed and Sealed this

Twenty-seventh Day of August 1985

[SEAL]

Attest:

DONALD J. QUIGG

Attesting Officer     Acting Commissioner of Patents and Trademarks